United States Patent [19]
Picard

[11] Patent Number: 4,794,594
[45] Date of Patent: Dec. 27, 1988

[54] METHOD AND SYSTEM OF ROUTING DATA BLOCKS IN DATA COMMUNICATION NETWORKS

[75] Inventor: Jean-Louis Picard, La Colle S/Loupe, France

[73] Assignee: International Business Machines Corporation, Armonk, N.Y.

[21] Appl. No.: 60,796

[22] Filed: Jun. 12, 1987

[30] Foreign Application Priority Data

Jun. 26, 1986 [EP] European Pat. Off. ........ 86430023.1

[51] Int. Cl.⁴ .............................................. H04J 3/24
[52] U.S. Cl. ......................................... 370/94; 370/85
[58] Field of Search ...................... 370/60, 94, 58, 93, 370/85

[56] References Cited

U.S. PATENT DOCUMENTS 4,736,363  4/1988  Aubin et al. ........................... 370/94
4,748,620  5/1988  Adelmann et al. .................... 370/94

Primary Examiner—Douglas W. Olms
Assistant Examiner—Frank M. Scutch, III
Attorney, Agent, or Firm—John B. Frisone

[57] ABSTRACT

The invention relates to a method of routing data blocks in a data communication network comprising a plurality of nodes through which the data blocks are routed. A node identifier and a port identifier are assigned to each node and to each port in the nodes, respectively. Once the route has been established in the sending station, thereby identifying the nodes in the route to be crossed over by the data blocks and in each node of the route the destination port to be used by that node, the sending station includes in the data blocks to be sent a routing tag RT whose value is such that:

RT modulo (Ni)=Pi where Ni are the node identifiers of the nodes in the route, and Pi are the destination port identifiers of the respective nodes in the route. At each node receiving a data block, dividing RT by the node identifier provides the destination port identifier which specifies the port through which the received block has to be retransmitted.

3 Claims, 5 Drawing Sheets

METHOD AND SYSTEM OF ROUTING DATA BLOCKS IN DATA COMMUNICATION NETWORKS

TECHNICAL FIELD

The present invention relates to high speed data communication networks and more particularly to a method of routing data blocks through transit nodes within a data communication network.

BACKGROUND ART

As high speed transmission facilities are becoming available at attractive prices, it becomes necessary to address the impact of such new facilities on network architecture, and particularly on routing in transit nodes. A high throughput is a key requirement for such nodes (several thousands of blocks of data per second), therefore routing tasks must be performed as rapidly as possible. Similar requirements can also be found in the interconnection of local area networks.

Usually routing in a network is performed by means of tables. This method implies a mechanism to enable a route manager function, which has to be in communication with each routing process, to load the routing tables in every node within the network, and to insure the consistency of their contents when changes occur in the route definitions.

Other methods do not need a routing table in intermediate nodes but imply that the contents of frames be changed by the routing process, or includes a long routing paths address.

SUMMARY OF THE INVENTION

It is therefore a general object of the present invention to provide a method and system of routing data blocks through a network in which the routing task within each transit node is minimal and can be executed by a microprocessor, or by hardware.

Another object of the invention is to provide a method and system of routing data blocks through a network which do not require the use of a long routing path address.

Another object of the invention is to provide a method and system of routing data blocks through a network which do not imply that the contents of the data blocks be modified by the transit nodes.

Another object of the invention is to provide a method and system of routing data blocks through a network which do not require any routing table in the transit nodes and any further change in the nodes if additional nodes are installed.

Generally, the invention provides a method for routing data blocks from a first station to a second station of a data communication network comprising a plurality of nodes through which the data blocks are routed, characterized in that it comprises the steps of:

(a) assigning a node identifier Ni to each node in the network;

(b) assigning a port identifier Pi to each port of each node;

(c) establishing a route to be followed by the data blocks sent by said first station to said second station, thereby identifying the nodes in the route to be crossed over by the data blocks and in each node of the route the destination port through which the node has to retransmit the data blocks;

(d) transmitting from said first station the data blocks, each data block including a routing tag RT whose value is such that:

$$RT \bmod (N1) = P1$$

$$RT \bmod (N2) = P2$$

.
.
.

$$RT \bmod (Nn) = Pn$$

where:

N1, N2, ..., Nn are the node identifiers of the nodes in the route, and

P1, P2, ..., Pn are the destination port identifiers of the respective nodes in the route; and (e) dividing at each node receiving a data block, the routing tag included in the received data block by the node identifier of this node, the division operation providing the destination port identifier which specifies the port through which the received block has to be retransmitted.

According to one aspect of the invention, said node identifiers are selected amongst the polynomials of the first degree of the Galois ring $G(2^8)$ and the port identifiers are selected amongst the elements of the same Galois ring.

The invention also provides a system for routing data blocks from a first station to a second station of a data communication network comprising a plurality of nodes through which the data blocks are routed, each node having a plurality of input/output ports, characterized in that it comprises:

means at said first station for providing to each data block to be sent to the second station, a routing tag RT whose value is a function of the route through the nodes to be followed by the data block to reach the second station;

means at said first station for transmitting the data blocks including the routing tag RT, over the network;

means at each node in the route for receiving the data blocks;

means at each node in the route for extracting the routing tag from the received blocks; and means at each node in the route for dividing the routing tag from the received blocks, by a node identifier Ni, and thereby providing a destination port identifier Pi which specifies the port of the node through which the received data blocks have to be retransmitted, the value of the routing tag RT being such that:

$$RT \bmod (N1) = P1$$

$$RT \bmod (N2) = P2$$

.
.
.

$$RT \bmod (Nn) = Pn$$

where:

N1, N2, ..., Nn are the node identifiers of the nodes in the route, and

P1, P2, ..., Pn are the destination port identifiers of the respective nodes in the route.

DETAILED DESCRIPTION OF THE INVENTION

Figure 1:
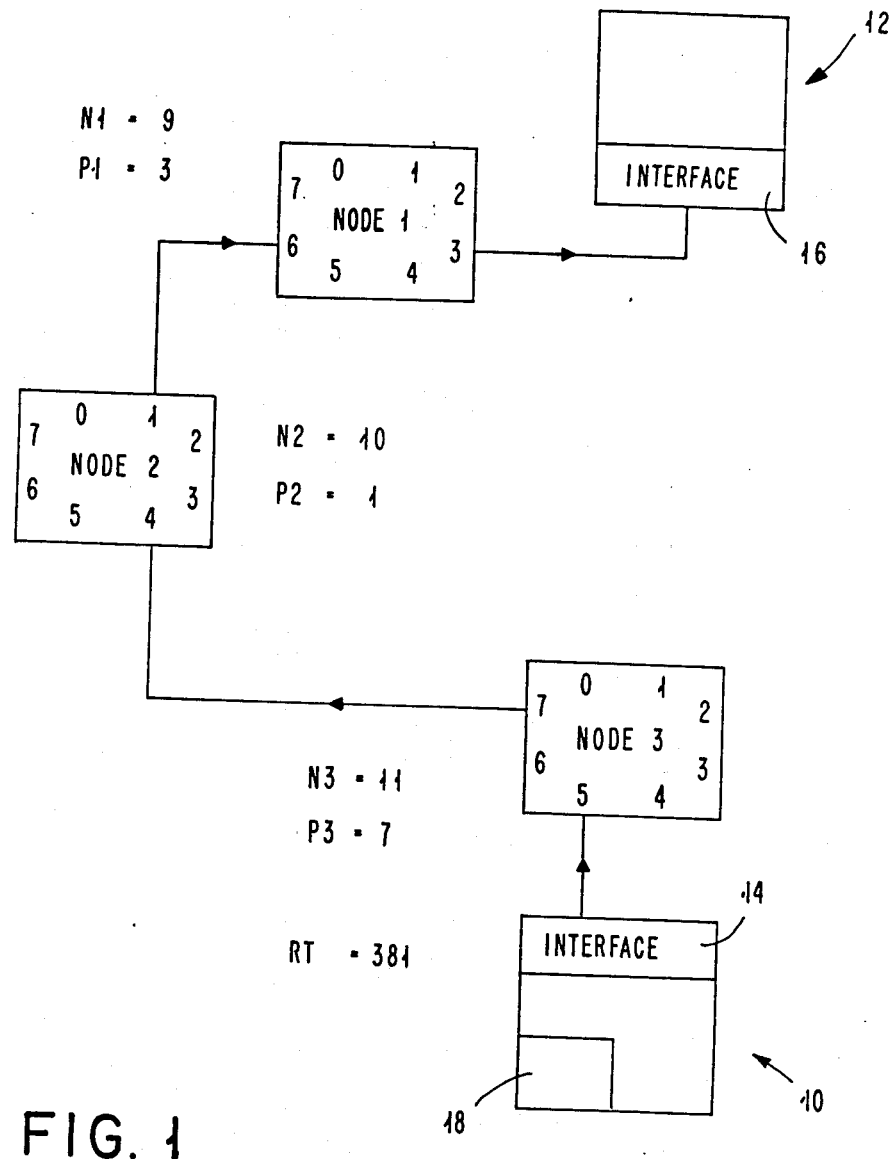
FIG. 1 shows a schematic representation of a network according to the teaching of the present invention.
Figure 2:
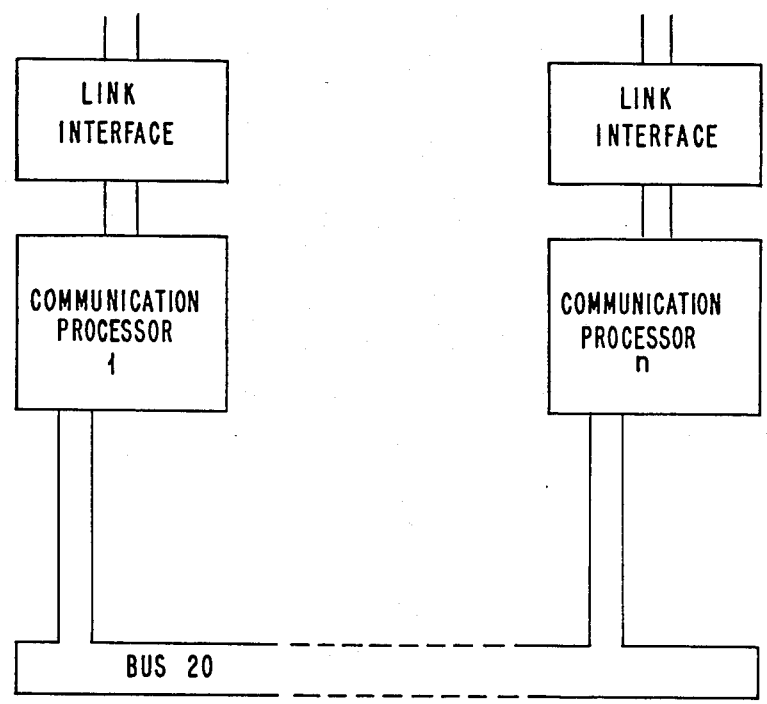
FIG. 2 is a block diagram showing the functional components of a node according to the invention.
Figure 3:
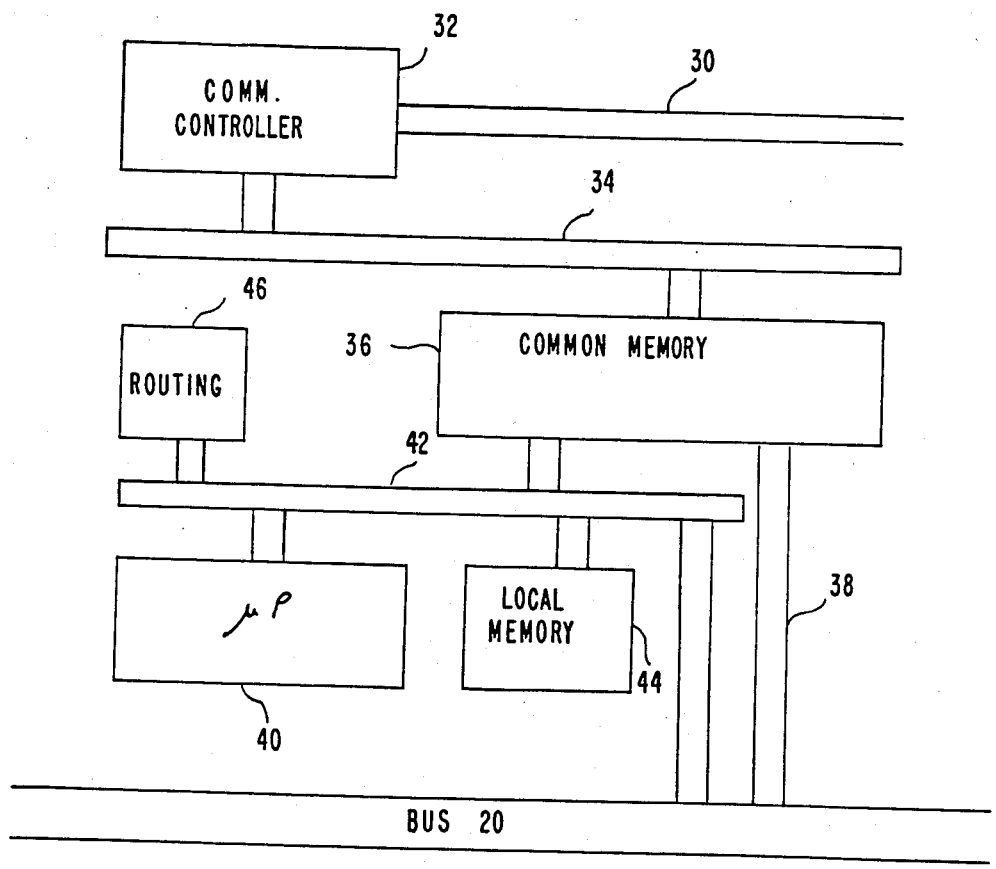
FIG. 3 is a block diagram a communication processor embodying the invention.

FIG. 1 shows an overall schematic diagram of a typical data communication network embodying the teaching of the present invention. Generally, in data communications networks, a plurality of stations exchanges data blocks organized in a specific format called a frame, which are routed from the transmitting station to the receiving station through a plurality of transit nodes. For clarity, FIG. 1 which will be used to describes the method of the invention, illustrates a system comprising only a transmitting station 10 transmitting frames to a receiving station 12, through three transit nodes referred to as Node 1 to Node 3. Each of the station could be, for example, an IBM 3725 Communication Controller attached to a host system and which is capable of transmitting and receiving data blocks in the form of frames of the type known as HDLC (High-level Data Link Control) frames. In FIG. 1, each of the node, Node 1 to Node 3, is shown as having, for example, eight input/output ports, and could be implemented as illustrated in FIGS. 2 and 3.

A Route is a path defined by a set of physical links and nodes allowing transmission of frames between the transmitting station and the receiving station. The transmitting station 10 adds a so-called Routing Tag (RT) whose value will be described later on, at the beginning of the frames to be sent to a receiving station through the network, and transmits it through its Link Interface 14, which can be of any type depending on the physical link used for transmission. The receiving station 12 receives the frames through its Link Interface 16 and deletes the Routing Tag at the end of the route. The Routing tag can be inserted in the HDLC frame as illustrated below.

F,RT,A,C,Info,FC,F

THE HDLC frame format is well known and made up of a header flag (F), an address field (A), a control field (C), an information field (Info), a frame check sequence field (FCS) and a trailer flag (F).

Each node which receives a frame, checks it for validity in accordance with the HDLC procedure. If the frame is found invalid, it is disregarded. If the frame is found valid, the Routing Tag is processed and provides an identifier of the output port of the node through which the received frame has to be retransmitted.

The Routing Tag RT is calculated by a route manager within the transmitting station when a route is established. A node I is given a specific node identifier Ni. When node I receives a frame, it calculates $Pi = RT$ modulo Ni, in other words, it divides RT by Ni and saves the remainder Pi. RT is calculated according to the Chinese Remainder Theorem in such a way that Pi gives directly the address of the link on which the corresponding frame is to be sent, in all nodes encountered on a route.

The Chinese Remainder Theorem may be expressed in the form:

In a unitary commutative ring, if we consider a set of elements $a1, a2, \ldots, an$ which are relatively prime by pairs and a set of elements $b1, b2, \ldots, bn$, such as $(bi \bmod (ai)) = bi$, then P defined by the following relation:

$$P = \sum_{i=1}^{i=n} \left[ bi \times \prod_{\substack{j=1 \\ j \neq i}}^{j=n} [aj \times Iaj(ai)] \right] \text{ modulo } \left[ \prod_{k=1}^{k=n} ak \right] \quad (1)$$

where:

Iaj(ai) is the inverse of aj modulo ai is such that:

$P \bmod (a1) = b1$
$P \bmod (a2) = b2$
$\ldots$
$P \bmod (an) = bn$

The fact that it is possible to derive from a single element of the ring a predetermined pair of elements is used to let each node derive from the Routing Tag RT, the identifier of the destination port through which the received frame has to be retransmitted.

The method of the invention is based on the following:

each node in the network is associated with a node identifier Ni selected amongst the elements $a1, a2, \ldots, an$ of the ring;

each port in each node is associated with a port identifier Pi selected amongst the elements $b1, b2, \ldots, bn$ of the ring;

in the transmitting station, once the route to be followed by the sent frames to reach the receiving station has been determined, that is, the nodes to be crossed over by the frames, and the output port to be used by the crossed nodes, the Routing Tag is calculated in accordance with relation (2) below which is directly derived from relation (1), and RT is inserted in the frame to be transmitted; and each node receiving a frame, divides the received RT by its node identifier Ni, which division operation provides the port identifier, Pi, and retransmits the received frame through the output port specified by this port identifier Pi.

$$RT = \sum_{i=1}^{i=n} \left[ Pi \times \prod_{\substack{j=1 \\ j \neq i}}^{j=n} [Nj \times INj(Ni)] \right] \text{ modulo } \left[ \prod_{k=1}^{k=n} Nk \right] \quad (2)$$

We have:

$RT \bmod (N1) = P1$ $RT \bmod (N2) = P2$ $$RT \bmod (Nn) = Pn$$

In actual networks, each station can be provided with a table containing the addresses of all the other stations in the network, and associated with each of the addresses the pre-computed RT corresponding to the route established for reaching that address. Computation of RT in accordance with relation (2) can be carried out by any programming routine in the station. When a station has to send a frame to a predetermined station, it has only to fetch out from the table the value of RT corresponding to the address of said predetermined station. The table has been illustrated as block 18 within station 10 in FIG. 1.

In the example shown in FIG. 1, the node and port identifiers have been selected from the ring of relative integers. Relations (1) and (2) are valid in all circumstances if the following conditions are met:

A node must be assigned an integer larger than the number of links it controls.

All integers assigned to nodes encountered on a route must be relatively prime by pairs.

In the example shown on FIG. 1 the three nodes are given the following integers:

identifier of Node 1: $N1=9$
identifier of Node 2: $N2=10$
identifier of Node 3: $N3=11$
identifier of the output port of Node 1: $P1=3$
identifier of the output port of Node 2: $P2=1$
identifier of the output port of Node 3: $P3=7$ RT is calculated in accordance with relation (2) which can be written in this example as:

$$RT = 3 \times 10 \times I10(9) \times 11 \times I11(9) + 1 \times 9 \times I9(10) \times 11 \times I11(10) + 7 \times 9 \times I9(11) \times 10 \times I10(11) \bmod (9 \times 10 \times 11)$$

Since:

$I10(9)=1$ because $10 \times 1 = 9 \times 1 + 1$ $I11(9)=5$ because $11 \times 5 = 9 \times 6 + 1$ $I9(10)=9$ because $9 \times 9 = 10 \times 8 + 1$ $I9(11)=5$ because $9 \times 5 = 11 \times 4 + 1$ $I10(11)=10$ because $10 \times 10 = 11 \times 9 + 1$ Then, $$RT = 34041 \bmod 990$$
$$= 381$$

It could be checked that:

$RT \bmod 9 = 3$ $RT \bmod 10 = 1$ $RT \bmod 11 = 7$

The integer to be put in RT has an upper bound which depends on the number of nodes encountered on a given route and on the integers assigned to these nodes. For n nodes on a route $$RT_{max} = (N1 \times N2 \times \ldots \times Nn) - 1$$

Where $N1, N2, \ldots Nn$ are the node identifiers.

For instance a two-byte RT will be adequate in a network including up to 12 nodes with a small number of ports, if the maximum number of nodes on a route is 3, the upper bound of a product of any three numbers picked in the list of numbers (11, 13, 14, 15, 17, 19, 23, 29, 31, 37, 41, 43) being lower than 65,535. As the number of nodes included in the network increases additional prime numbers have to be added to the list and the size of RT increases.

Divisions of large integers may become cumbersome, moreover this operation is not implemented in all microprocessors.

As the division is also defined in the algebra of polynomials, the routing Tag RT and the identifiers can also be determined using the algebra of polynomials. Polynomials can be used in many ways, however as microprocessors are designed to handle bytes, we will concentrate on the application of polynomials with 8-bit coefficients.

Let us consider a primitive polynomial of degree 8 with binary coefficients:

$$G(X) = X^8 + X^4 + X^3 + X^2 + 1$$

A root a of this polynomial, when raised at all powers from 1 to 255, will generate all the non zero elements of a Galois field made of 256 elements, referred to as $GF(2^8)$.

Let us assign now to each node of a network a polynomial $Ni(X)$ of first degree with coefficients in $GF(2^8)$ $$Ni(X) = X + ai$$

where i can vary from 1 to 255. As 0 can also be used, the capability to have 256 nodes in the network is provided. It can easily be verified that for any pair of different polynomials $(X+ai)$ and $(X+ak)$ it is possible to find ai such that:

$$ai \times (X+aj) = 1 \text{ modulo } (X+ak)$$

Thus it is possible to assign to each node identifier a polynomial of first degree with coefficients within $GF(2^8)$, $Pi(X) = X + ai$, and assign to each port identifier a polynomial of degree zero, that is an element of $GF(2^8)$. The Routing Tag RT can be calculated by using relation (1) which when used with polynomials can be written in the form:

$$RT = \sum_{i=1}^{i=n} \left[ Pi \times \prod_{\substack{j=1 \\ j \neq i}}^{j=n} [(X+aj) \times I(X+aj)(X+ai)] \right] \quad (3)$$

We still have:

$RT \bmod (N1) = P1$ $RT \bmod (N2) = P2$ $$RT \bmod (Nn) = Pn$$

If an information frame is to be routed through n nodes, the RT polynomial will have at most degree n−1, that is the RT will have a maximum size of n bytes.

If a polynomial of degree 1 or higher is divided by $Ni(x)$ the remainder of the division will have degree zero that is, the remainder will be one of the 256 elements of $GF(2^8)$. This allows a node to have up to 256 ports.

Computation of RT in accordance with relation (3) can be carried by any programming routine in the stations. Because the inverse of any element of ring $G(2^8)$ is an element of this ring it is easy to determine a table containing the inverse element for every element of the ring. This speeds up computation of RT. Such a table has been constructed for the elements of $G(2^8)$ and is shown hereafter.

| | 0 | 1 | 2 | 3 | 4 | 5 | 6 | 7 | 8 | 9 | A | B | C | D | E | F |
|---|---|---|---|---|---|---|---|---|---|---|---|---|---|---|---|---|
| | | | | | | INVERSE TABLE IN $G(2^8)$ | | | | | | | | | | |
| 00 | | 01 | 8E | F4 | 47 | A7 | 7A | BA | AD | 9D | DD | 98 | 3D | AA | 5D | 96 |
| 10 | D8 | 72 | C0 | 58 | E0 | 3E | 4C | 66 | 90 | DE | 55 | 80 | A0 | 83 | 4B | 2A |
| 20 | 6C | ED | 39 | 51 | 60 | 56 | 2C | 8A | 70 | D0 | 1F | 4A | 26 | 8B | 33 | 6E |
| 30 | 48 | 89 | 6F | 2E | A4 | C3 | 40 | 5E | 50 | 22 | CF | A9 | AB | 0C | 15 | E1 |
| 40 | 36 | 5F | F8 | D5 | 92 | 4E | A6 | 04 | 30 | 88 | 2B | 1E | 16 | 67 | 45 | 93 |
| 50 | 38 | 23 | 68 | 8C | 81 | 1A | 25 | 61 | 13 | C1 | CB | 63 | 97 | 0E | 37 | 41 |
| 60 | 24 | 57 | CA | 5B | B9 | C4 | 17 | 4D | 52 | 8D | EF | B3 | 20 | EC | 2F | 32 |
| 70 | 28 | D1 | 11 | D9 | E9 | FB | DA | 79 | DB | 77 | 06 | BB | 84 | CD | FE | FC |
| 80 | 1B | 54 | A1 | 1D | 7C | CC | E4 | B0 | 49 | 31 | 27 | 2D | 53 | 69 | 02 | F5 |
| 90 | 18 | DF | 44 | 4F | 9B | BC | 0F | 5C | 0B | DC | BD | 94 | AC | 09 | C7 | A2 |
| A0 | 1C | 82 | 9F | C6 | 34 | C2 | 46 | 05 | CE | 3B | 0D | 3C | 9C | 08 | BE | B7 |
| B0 | 87 | E5 | EE | 6B | EB | F2 | BF | AF | C5 | 64 | 07 | 7B | 95 | 9A | AE | B6 |
| C0 | 12 | 59 | A5 | 35 | 65 | B8 | A3 | 9E | D2 | F7 | 62 | 5A | 85 | 7D | A8 | 3A |
| D0 | 29 | 71 | C8 | F6 | F9 | 43 | D7 | D6 | 10 | 73 | 76 | 78 | 99 | 0A | 19 | 91 |
| E0 | 14 | 3F | E6 | F0 | 86 | B1 | E2 | F1 | FA | 74 | F3 | B4 | 6D | 21 | B2 | 6A |
| F0 | E3 | E7 | B5 | EA | 03 | 8F | D3 | C9 | 42 | D4 | E8 | 75 | 7F | FF | 7E | FD |

FIG. 2 illustrates the schematic diagram of an example of transit node which embodies the invention. It mainly comprises a plurality of communication processors, each serving a port of the node. These communication processors, which will be described in details in connection with FIG. 3, are interconnected by a bus 20 which can be the Multibus 1 (*) marketed by Intel (*). Each of the communication controllers is connected to other nodes or to a station through a port comprised of an appropriate high speedlink interface such as a V24 or a fiber optics interface. Such interfaces are widely used in the industry of data communications. In the example shown in FIG. 2, a routing mechanism according to the invention is included in each of the communication processors as will be explained subsequently. More details on the Multibus 1 bus is available in "Intel Multibus Specification" from Intel.

(*) Multibus and Intel are trademarks of Intel Corporation.

FIG. 3 shows a block diagram for any one of the communication processors. The Link Interface is connected by a bus 30 to a communication controller 32 which, in the example shown in the figure is an Intel 82586 communication controller marketed by Intel. The communication controller 32 is connected through its local bus 34 to a common memory 36. Not shown in the figure, an Intel 8207 Advanced Dynamic RAM Controller controls the common memory 36. More details on the common memory 36 and the RAM Controller are available in "Microsystem Components Handbook-Volume 1" from Intel. The common memory 36 is connected to bus 20 via a bus 38 and to a microprocessor 40 through the microprocessor local bus 42. Microprocessor 40 is also connected to its local memory 44 and bus 20 through its local bus 42. Bus 42 is connected to the routing mechanism 46 which is shown in details in FIG. 5. In the example shown in the figure, the microprocessor 40 is an Intel 80186 microprocessor marketed by Intel.

In operation, when a frame is coming from the Link Interface, it is handled by communication controller 32 which performs the following tasks:

Header flag recognition

Zero bit deletion

FCS checking

Data de-serialization and buffering into a so-called received frame area within the common memory 36.

Information on the location and status of received frames is available in buffer descriptors also stored in common memory 36. A buffer descriptor includes information such as:

The address of the first character of the received frame.

The length of the frame.

The address of the next buffer descriptor (if any) related to the same destination port.

a flag meaning that the frame has been read by the destination port.

A part of common memory 36 is reserved to store small areas, called port pointers, each one affected to one destination port and including the address of the first buffer descriptor related to frames for that port.

Communication controller 32 executes commands stored in common memory 36 by microprocessor 40. Communication between the communication controller 32 and microprocessor 40 is carried out via the common memory 36 and four hardware signals (not shown in the figure):

Interrupt signal used by controller 32 to draw microprocessor 40 attention

Channel attention signal used by microprocessor 40 to draw controller 32 attention Hold signal used by controller 32 to request access to common memory 36

HLDA signal used by microprocessor 40 to accept the above request.

More details on the communication controller 32 are available in the "Microsystem Components Handbook-Volume 2" from Intel.

When a valid frame has been stored in the common memory 36, communication controller 32 informs microprocessor 40 which fetches out the routing tag of the received frame from the common memory, and stores it in its local memory 44. Then, microprocessor 40 transfers the routing tag to the routing mechanism 46 which divides the routing tag by the node identifier and provides the port identifier which specifies the destination port to which the received frame has to be transmitted. Microprocessor 40 reads out the port identifier from the routing mechanism 46 and stores it in its local memory 44. Microprocessor 40 then writes the port pointer associated with the destination port, within the common memory 36, with information on the received frame, and sends a message to the communication processor serving the destination port through bus 20.

When the destination processor receives the message from the source port it reads its destination pointer within common memory 36, reads the received frame from that memory and stores it in the common memory of its communication processor. The received frame is then retransmitted through the communication controller of the communication processor serving the destination port.

Figure 4A:
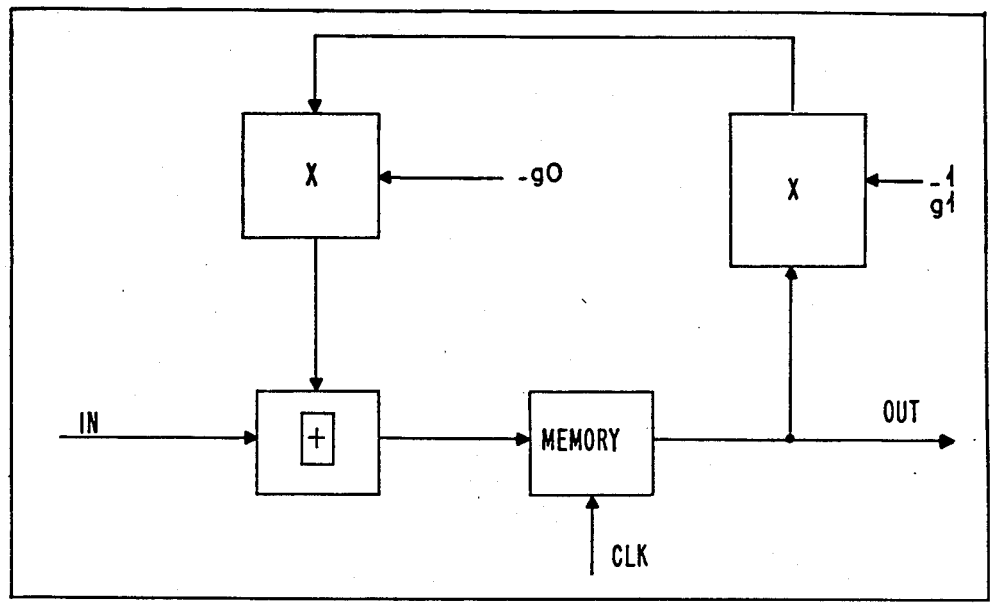
FIG. 4A is a block diagram showing the principle of operation of a polynomial divider.
Figure 4B:
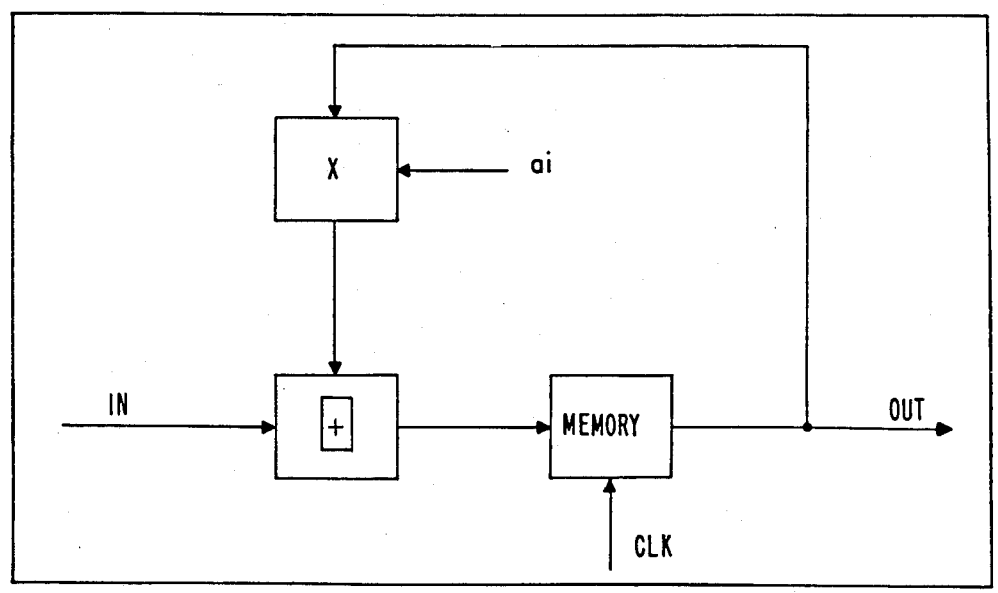
FIG. 4B is a block diagram showing the principle of operation of routing mechanism 46.
Figure 5:
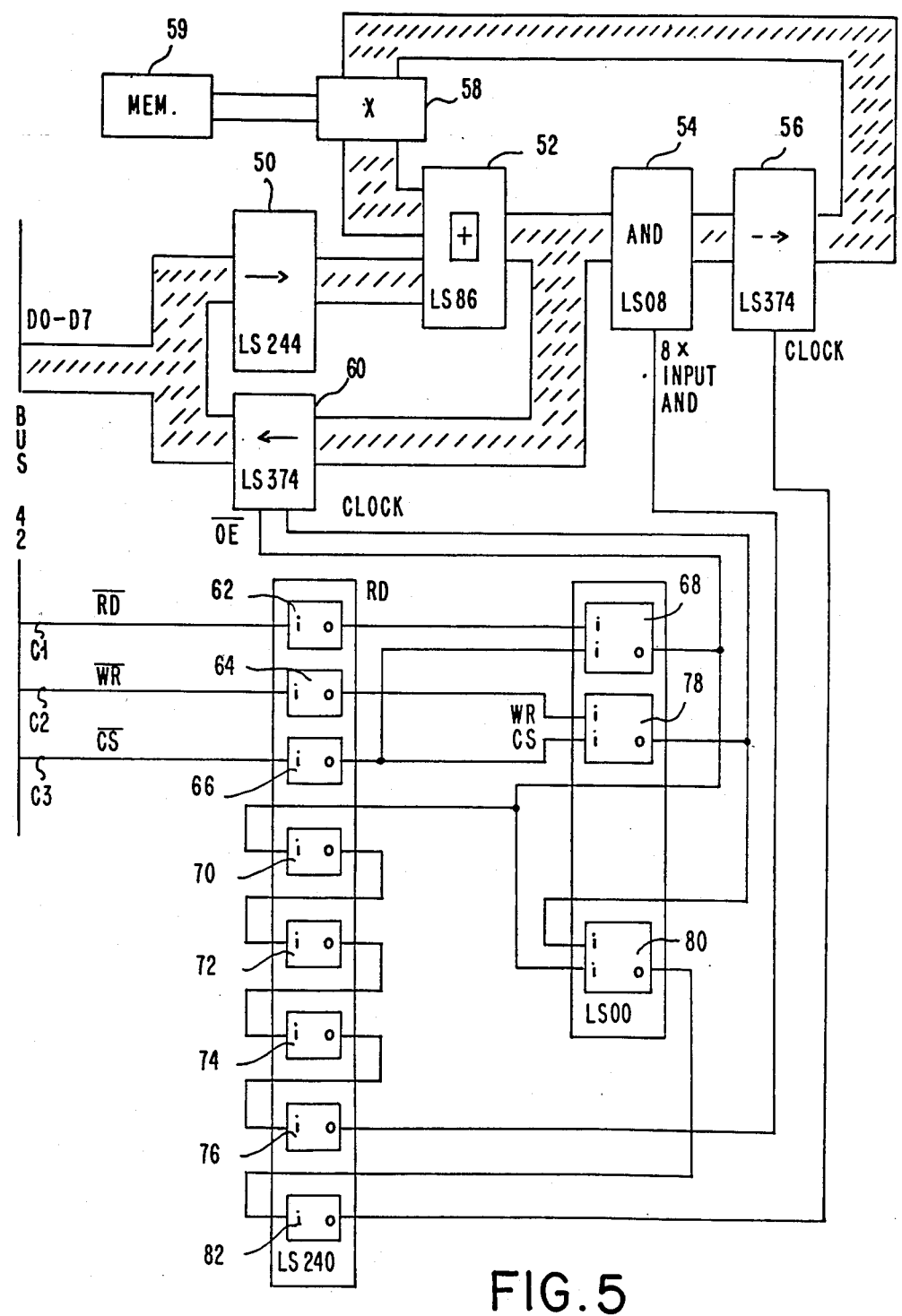
FIG. 5 is a block diagram of the routing mechanism 46 according to the invention.

FIGS. 4A and 4B show the principle of operation of the routing mechanism 46 whose details are shown in FIG. 5, and which implements the routing method of the invention with polynomials in ring $G(2^8)$. As a reminder, when using polynomials, each node identifier is a polynomial of first degree of the form: $Pi(X)=X+ai$, and each port identifier is a polynomial of degree zero, that is, an element of $G(2^8)$.

FIG. 4A illustrates the principle of operation of the division of any polynomial of any degree, n, by a polynomial of first degree which can be expressed in the form: $g1X+g0$. At each clock (CLK) time, a coefficient of the polynomial to be divided is inputted to the device of FIG. 4A. After $n+1$ clock times, the remainder of the division is available at the output from the memory element.

The diagram of FIG. 4A can be simplified when using polynomials in $G(2^8)$, and when the divider polynomial of first degree is of the form: $X+ai$.

Because the polynomial is $X+ai$, in the diagram of FIG. 4A, we will have $g1=g1^{-1}=1$;

In $G(2^8)$, each element is equal to its opposite, then we will have $-g0=g0$.

Accordingly, the diagram of FIG. 4A becomes that of FIG. 4B, which comprises only one multiplication by ai.

FIG. 5 illustrates an exemplary embodiment of the routing mechanism 46 whose principle of operation is shown in FIG. 4B. The data bus lines D0–D7 from bus 42 (FIG. 3) are applied to the inputs of a 8-driver module 50 which can be of the LS244 type and whose outputs are connected to the first inputs set of a 8-XOR circuit module 52 which can be of the LS86 type.

The outputs of module 52 are applied to the first inputs set of an 8-AND gate module 54 which can be of the LS08 type, and whose outputs are applied to the inputs of an 8-latch module 56 of the LS374 type. The outputs from module 56 are applied to one of the inputs of multiplier 58 whose other input receives the output from memory element 59. The output from multiplier 58 is applied to the second inputs set of module 52 whose outputs are also connected to the inputs of an 8-latch module 60 having its outputs connected to lines D0–D7. The memory element 59 contains coefficient ai of the node identifier Ni.

Lines C1, C2 and C3 from bus 42 are connected to the input of inverters 62, 64, and 66. Lines C1, C2 and C3 carry signals S1*, S0* and PCS5* provided by the Intel 80186 microprocessor, which signals are used by the routing mechanism as $\overline{READ}$ ($\overline{RD}$), $\overline{WRITE}$ ($\overline{WR}$) and $\overline{CHIP\ SELECT}$ ($\overline{CS}$), respectively. The output of inverter 62 is connected to one input of NAND gate 68 having its other input connected to the output of inverter 66 and its output connected to module 60. The output of NAND gate 68 is also connected to the input of a chain comprised of four inverters 70, 72, 74 and 76. The output of inverter 76 is connected to the eight inputs of the second inputs set of module 54. The outputs of inverters 62 and 64 are connected to the two inputs of NAND gate 78 whose output is connected to the clock input of module 60 and to one input of NAND gate 80 which has its other input connected to the output of NAND gate 68. The output of NAND gate 80 is connected to the clock input of module 56 through an inverter 82.

The first operation which takes place in the routing mechanism is a read operation which is controlled by signals RD and CS which are available at the outputs of inverters 62 and 66, respectively. Signals RD and CS produce signal $\overline{OE}$ which activates the output enable input of module 60, and causes the contents of latch module 60 to be read out on lines D0–D7. Signal $\overline{OE}$ also forces to zero the outputs from module 54, setting the module 56 to zero. As the coefficients of RT are available on lines D0–D7, write operations are carried out. A write operation is controlled by signals WR and CS. Each time a coefficient is inputted to the mechanism, it goes through module 50, XOR module 52, module 54 and module 56 whose output is multiplied by ai in multiplier 58 which provides a partial result which is stored in latch module 60. When all the coefficients have been inputted to the mechanism, the result of the operation, that is the destination port identifier is available in latch module 60 which is read by microprocessor 40 through a Read operation.

The routing mechanism illustrated in FIG. 5 can be replaced by a program running in microprocessor 40, but it has been found that such a program would not be as fast as desirable.

I claim:

1. A method for routing data blocks from a first station to a second station of a data communication network comprising a plurality of nodes through which the data blocks are routed, characterized in that it comprises the steps of:
    (a) assigning a node identifier Ni to each node in the network;
    (b) assigning a port identifier Pi to each port of each node;
    (c) establishing a route to be followed by the data blocks sent by said first station to said second station, thereby identifying the nodes in the route to be crossed over by the data blocks and in each node of the route the destination port through which the node has to retransmit the data blocks;
    (d) transmitting from said first station the data blocks, each data block including a routing tag RT whose value is such that:

$$RT \text{ modulo } (N1) = P1$$

-continued $$RT \text{ modulo } (N2) = P2$$
$$\vdots$$
$$RT \text{ modulo } (Nn) = Pn$$

where:
- N1, N2, ..., Nn are the node identifiers of the nodes in the route, and
- P1, P2, ..., Pn are the destination port identifiers of the respective nodes in the route; and (e) dividing at each node receiving a data block, the routing tag included in the received data block by the node identifier of this node, the division operation providing the destination port identifier which specifies the port through which the received block has to be retransmitted.

2. A method according to claim 1, characterized in that said node identifiers are selected amongst the polynomials of the first degree of the Galois ring $G(2^8)$ and the port identifiers are selected amongst the elements of the same Galois ring.

3. A system for routing data blocks from a first station to a second station of a data communication network comprising a plurality of nodes through which the data blocks are routed, each node having a plurality of input-/output ports, characterized in that it comprises:

means at said first station for providing to each data block to be sent to the second station, a routing tag RT whose value is a function of the route through the nodes to be followed by the data block to reach the second station;

means at said first station for transmitting the data blocks including the routing tag RT, over the network;

means at each node in the route for receiving the data blocks;

means at each node in the route for extracting the routing tag from the received blocks; and means at each node in the route for dividing the routing tag from the received blocks, by a node identifier Ni, and thereby providing a destination port identifier Pi which specifies the port of the node through which the received data blocks have to be re-transmitted, the value of the routing tag RT being such that:

$$RT \text{ modulo } (N1) = P1$$
$$RT \text{ modulo } (N2) = P2$$
$$\vdots$$
$$RT \text{ modulo } (Nn) = Pn$$

where:
- N1, N2, ..., Nn are the node identifiers of the nodes in the route, and
- P1, P2, ..., Pn are the destination port identifiers of the respective nodes in the route.

* * * * *